June 30, 1964  W. FALGOUT ETAL  3,138,956
OIL FIELD DEVICE FOR DETERMINING THE LIQUID LEVEL OF A MUD PIT
Filed Dec. 8, 1960  3 Sheets-Sheet 1

WILLIAM J. FALGOUT
OTIS M. SOLOMON
INVENTOR.

BY *Walter J. Lanier*

ATTORNEY.

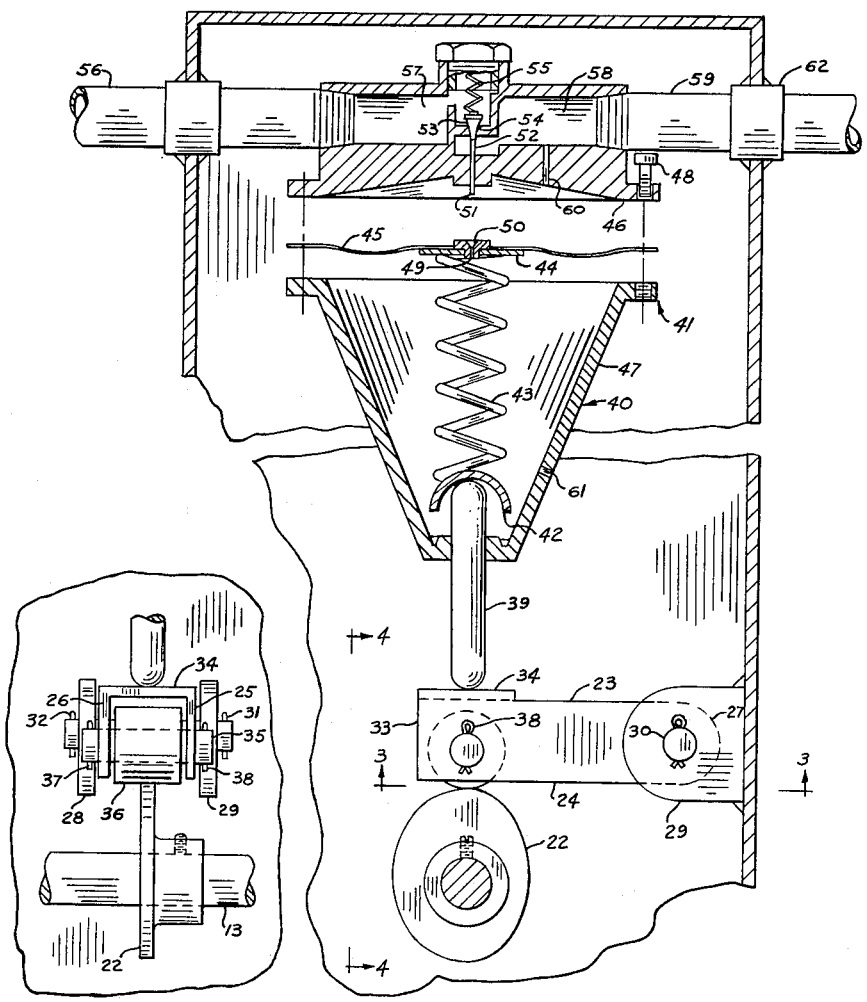

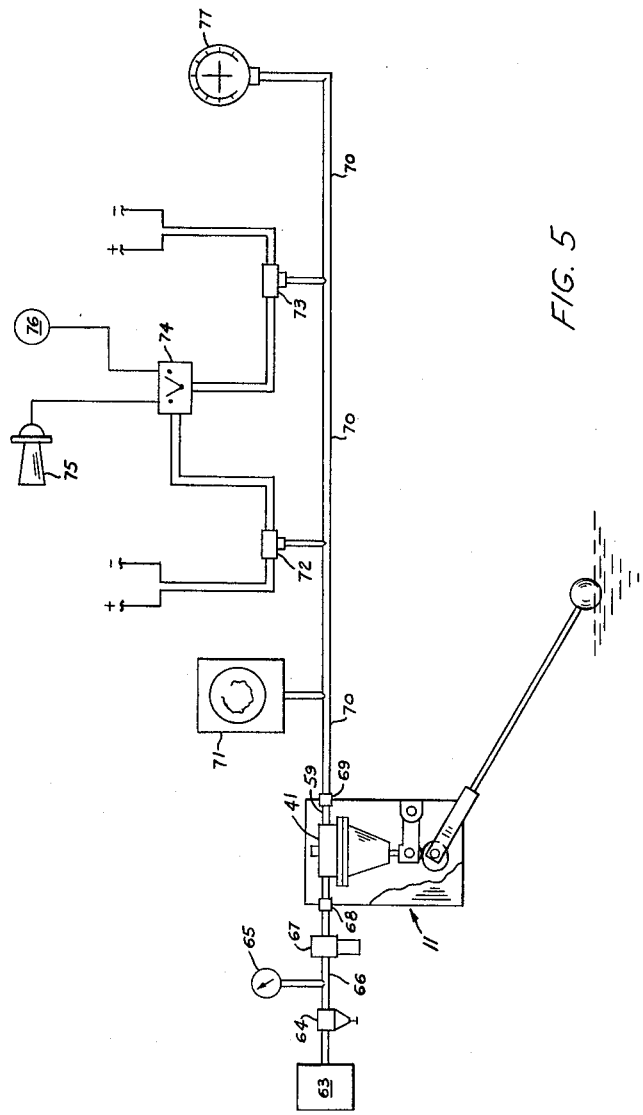

United States Patent Office 3,138,956
Patented June 30, 1964

3,138,956
OIL FIELD DEVICE FOR DETERMINING THE LIQUID LEVEL OF A MUD PIT
William Falgout, 3802 Leila Place, New Orleans 21, La., and Otis M. Solomon, New Orleans, La. (820 Genevieve Drive, Lafayette, La.)
Filed Dec. 8, 1960, Ser. No. 74,665
9 Claims. (Cl. 73—316)

This invention relates to the rotary method of oil well drilling, and more particularly to a means for indicating the level of the drilling mud in the mud pit.

In the drilling of oil wells by the rotary method, a drilling fluid, known in the art as drilling mud, is pumped downwardly through the drill string and returned to the surface through the space left in the hole which is not occupied by the drill string. At the surface, the drilling mud enters a mud pit, which is of an adequate size to maintain sufficient mud to meet all requirements during drilling operations. The detection of a gradual decline in the mud level indicates the time when additional mud shall be prepared and added. If there is a rapid decline in the level of the mud, steps may be taken to determine and to remedy the cause of such loss. On the other hand, if there is infiltration from penetration of a water sand or a gas or oil sand, which immediately results in an increase in the volume of the drilling fluid, prompt detection of the increase in level during drilling will dictate immediate steps to be taken to prevent a blowout and hence avert possible loss of life or equipment.

The mud pit is usually located some distance away from the driller, who is in a position to remedy any of the above enumerated situations. Hence, it is desirable to have an indicator which can be located conveniently near the driller, and which will instantly indicate a rapid increase or decrease in the mud level, or a gradual decline in the mud level in the pit.

Oil wells are often located a great distance away from population centers in isolated areas, where it is not feasible to have a large supply of spare parts on hand. It is, therefore, particularly desirable that oil field equipment be of rugged construction, extremely reliable, and not readily subject to damage by rough handling in adverse conditions.

Accordingly, it is an object of this invention to provide a device for measuring the mud pit level at an oil well that is simply and ruggedly built, easily transported, and which can be readily installed at an oil well.

Another object is to provide a device for the purpose indicated that is relatively inexpensive to manufacture and maintain, and which, at the same time, indicates fluid level and changes thereof with a high degree of accuracy.

Another object is to provide a pit level indicator which will provide the desired information at any selected point at the site of drilling operations.

These and other objects and advantages of the invention will be fully set forth in the foregoing description made in connection with the accompanying drawings, in which like reference characters refer to the same parts throughout the different views, and in which:

FIGURE 2 is an enlarged view taken along line 2—2 of FIGURE 1.

FIGURE 4 is a partial view taken along line 4—4 of FIGURE 2 showing the relation and details of construction of the cam and pivot mechanism.

FIGURE 5 is a largely schematic view, showing the relationship of the various part embodying the invention.

Figure 1:
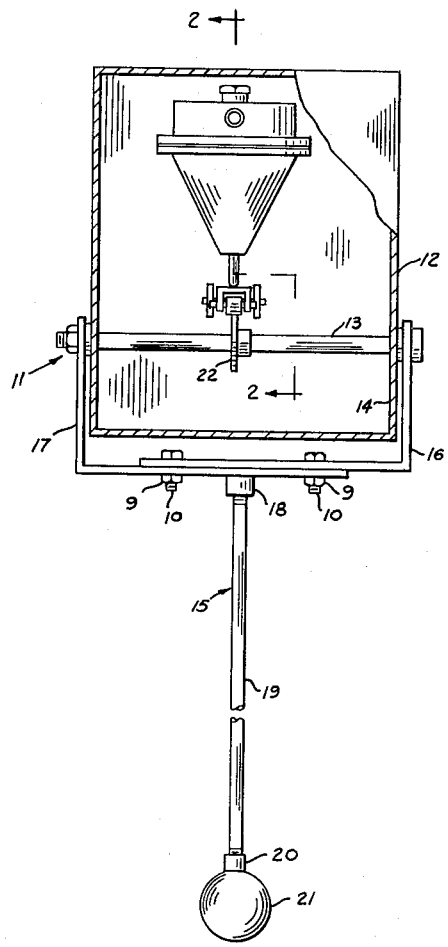
FIGURE 1 is a front view of the translating device of the invention shown with its casing partially removed.
Figure 3:
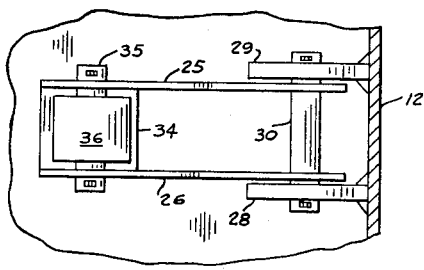
FIGURE 3 is a partial view taken along line 3—3 of FIGURE 2 showing details of construction of the pivot mechanism.

A translating device, shown at 11 in FIGURE 1, is a self-contained unit totally enclosed in a casing 12. A shaft 13 extends through the side of the casing near its lower end 14, and is rotatably mounted to the casing. A lever 15 is rigidly connected to the ends of the shaft 13 by means of L-shaped arms 16 and 17. The arms 16 and 17 are joined together by a pair of nuts 9 and bolts 10, as shown in FIGURE 1. A pipe section 18, welded to the arm 17, connects the arms to the trunk 19 of the lever 15. A float 21 is attached to the trunk of the lever at its lower end by a suitable connector 20, as shown in FIGURE 1.

Inside the casing, an eccentric cam 22 is rigidly attached to the center of the shaft 13. Thus, the cam 22, the shaft 13, and the lever 15 rotate as a unit in relationship to the casing 12 about the pivot point shown at 40 in FIGURE 2.

A pivot mechanism 23 rests on top of the cam 22. The pivot mechanism 23 consists of a bar 24, having two parallel legs 25 and 26. At the rearward end 27 of the bar, the legs are pivotally attached to a pair of brackets 28 and 29 by means of an axle 30 held in place by cotter pins 31 and 32.

At the forward end 33 of the bar, the legs are joined together at their upper portions by means of a cap member 34. Below the cap member, an axle 35 extends through the legs and supports a roller 36, which is freely rotatable and rests on top of the cam 22. The axle 35 is held in place by means of cotter pins 37 and 38.

A plunger rod 39 rests on top of the cap member. The plunger rod is spring mounted within the housing 40 of a valve assembly 41. The plunger rod exerts full force against the spring retaining member 42, which, in turn, pushes against the spring 43 which is in compression. The spring 43 exerts pressure against the support 44. The support 44 is attached to the flexible diaphragm 45. The diaphragm 45 acts as a seal between the upper part 46 and the lower part 47 of the housing 40. The two parts of the housing are clamped together by screws 48.

The support 44 has an aperture 49, which is bevelled at its upper portion to form a seat 50 for the bottom portion 51 of the valve 52. Consequently when the bottom portion 51 is firmly thrust into seat 50, access to aperture 49 is denied the fluid above diaphragm 45. The frustroconical upper portion 53 of the valve rests on a second seat 54, and a spring 55 exerts a downward pressure on the top of the valve.

Air enters the valve assembly through an intake pipe 56 into the inlet aperture 57 in the upper part 56 of the housing 40. Air is normally maintained at a constant pressure in the intake pipe. Air pressure in the outlet aperture 58 and the outlet pipe 59 leaving the valve assembly will vary with the movement of the cam 22.

An air hole 60 extends through the upper part 46 of the housing 40 from the aperture 58, to relieve excess pressure. Excess air will flow past the seat 50 into the aperture 49 and out of the second air hole 61 in the lower part 47 of the housing 40. Furthermore, air hole 60 acts to apply the pressure existing in aperture 58 to the top of diaphragm 45 at the time that valve 52 is pushed upwards by an upward thrust of plunger rod 39 as transmitted through spring 43.

In operation, the float 21 will rise with a rise in the liquid level of the mud pit. This, in turn, will cause the cam 22 to rotate, which will raise the pivot mechanism 23 and, in turn, the plunger rod 39. The plunger rod 39 will push against the spring retaining member 42 and spring 43, which will, in turn, push against the support 44. The seat 50 in the support 44 will push against the bottom portion 51 of the valve, which will cause the valve to rise. This will enable more air to flow past the second seat 54 from inlet aperture 57 into outlet aperture 58, thus increasing the air pressure in outlet aperture 58 and outlet pipe 59. This increased pressure in outlet aperture 58 is transmitted via air hole 60 to push downward against diaphragm 45. As diaphragm 45 now moves downward against the compression of spring 43, spring 55 bears against valve 52 so as to cause this valve to also move downward and in so doing, to stop the flow of air from the inlet aperture 57 into aperture 58. Consequently, the pressure in aperture 58 has been increased to an amount necessary to apply a force against diaphragm 45 and so overcome the increased upward force of spring 43 which in turn is caused by the raising of plunger 39. In other words, when plunger rod 39 is raised by any increase in the liquid level, it compresses spring 43 which applies a greater upwards force against diaphragm 45 so as to admit more air and thus raise the pressure of the air in aperture 58. This increased pressure now rebalances diaphragm 45 to its unflexed position whereby valve 52 is closed.

When the liquid level in the mud pit falls, the float 21 will fall. This, in turn, will cause the cam 22 to rotate and enable the pivot mechanism to pivot downwardly. As a consequence, the compression of the spring 43 will be reduced which in turn unbalances the forces tending to hold diaphragm 45 in its unflexed position. Since the upwards force against diaphragm 45 is reduced by the lowering of plunger rod 39, the existing pressure in aperture 58 applied against diaphragm 45 through air hole 60 causes said diaphragm to drop, thus unseating the bottom portion 51 of valve 52. This in turn allows the air in aperture 58 to immediately bleed out past the seat 50 through aperture 49 and from there to exit from air hole 61, so as to reduce the pressure tending to force diaphragm 45 downwards. Consequently, diaphragm 45 returns to its unflexed position which occurs when valve stem 51 is seated to block aperture 49 and thus prevent further egress of air from aperture 58. After this operation, the pressure in aperture 58 is lower than that existing prior to the lowering of plunger 39. A constant air pressure is maintained in the outlet aperture for each position of the cam, which, in turn, is a function of the height of the float valve 21. The cam is empirically shaped on its outer surface, so that the height of mud above a predetermined level is in direct relationship to pounds per square inch of air pressure in the outlet pipe.

The overall operation of the invention can now be seen by referring to FIGURE 5. A source of pressurized air, shown schematically at 63, flows through an air regulator 64, to reduce the pressure to a constant uniform amount, which is maintained at all times. As a check, a pressure gauge 65 may be inserted in the inlet flow line 66. In addition, if desired, an air filter 67 is inserted in the inlet flow line before the inlet flow line is connected to the valve assembly 41 of the translative device 11 by means of connector 68. The outlet pipe 59 of the valve assembly is connected to the outlet flow line 70 by means of connector 69.

Actuated by the air pressure in flow line 70, are four devices which can be conveniently located for the driller anywhere along the outlet flow line as desired. The first device shown schematically at 71 is a pressure recorder which is adapted to continuously record the liquid level in the mud pit in terms of air pressure on a circular graph, which can be powered by a spring wound clock mechanism.

The next two devices shown schematically at 72 and 73 are a pair of electrical switches actuated by air pressure.

Switch 72 is a higher pressure electric switch in which air pressure above a predetermined amount will cause its switch contact to close, and this, in turn, will supply electricity to an alarm device through its selector switch shown schematically at 74. The selector switch can be adjusted to sound a horn, shown schematically at 75, or light an electric bulb, shown schematically at 76.

Conversely, switch 73 is a low pressure electric switch, in which air pressure below a predetermined amount will cause its switch contact to close, and this, in turn, will supply electricity to the selector switch 74. As above stated, the selector switch can be adjusted to sound a horn 75, or light an electric bulb 76.

The last device shown schematically at 77 is a pressure gauge which is calibrated to read air pressure in terms of height of liquid level in the mud pit. Thus, the driller will be able to determine the liquid level in the mud pit by merely glancing at the pressure gauge, which is conveniently located for him.

In operation, the pressure recorder permits a permanent record of mud level conditions. The electric switches 72 and 73, coupled with the alarm device 75, give the driller a warning of pressure changes. The pressure gauge 77 can be used to check to see what adjustments are necessary in the drilling mud operations.

As can be seen from the foregoing, the invention provides an air actuated pit level indicator, which can be ruggedly built to withstand adverse conditions, and yet will accurately provide the information necessary to the driller at a convenient location to enable him to perform drilling operations efficiently and safely.

What is claimed is:

1. A self-contained translative device used in connection with other component parts for indicating the liquid level in a mud pit in oil well drilling operations, comprising a casing having upper and lower ends, a front, a rear and two sides, a shaft extending through both sides of said casing and rotatably mounted thereto, a lever fixably attached at its upper end to said shaft outside of said casing, a cam fixably attached to said shaft inside of said casing, said lever having a lower end adapted so that a float resting on a body of liquid may be fixably attached thereto, a pivot mechanism pivotally attached to the inside of said casing and resting on said cam, a plunger rod located above and resting on said pivot mechanism and adapted to rise and fall as said shaft and cam are rotated with the rise and fall of said float and the liquid level of the body of liquid, an air inlet pipe adapted to receive pressurized air and an outlet air pipe adapted to discharge pressurized air, each of said pipes extending through said casing near its upper end, a valve separating said pipes within said casing, said plunger rod having an upper end operating said valve, said valve being adapted to vary the amount of air pressure in said outlet pipe with respect to the air pressure in said inlet pipe as said plunger rod rises and falls in conjunction with the rotation of said cam, shaft, lever and float, so that the height of rise of said float can be measured in terms of air pressure.

2. A self-contained translative device used in connection with other component parts for indicating the liquid level in a mud pit in oil well drilling operations, comprising a casing having an upper and lower end and two sides, a shaft extending through both sides of said casing and rotatably mounted thereto, a lever fixably attached at its lower end to said shaft outside of said casing, a cam fixedly attached to said shaft inside of said casing, said lever having a lower end adapted so that a float resting on a body of liquid may be fixably attached thereto, a pivot mechanism, said pivot mechanism comprising a bar having two ends, one of said ends pivotally attached to the inside of said casing, said second end supporting a roller rotatably mounted to said bar and adapted to rest on the upper surface of said cam, a plunger rod located above and resting on said pivot mechanism and adapted to rise and fall as said shaft and cam are rotated with the rise and fall of said float and the liquid level of the body of liquid, an inlet air pipe adapted to receive pressurized air and an outlet air pipe adapted to discharge pressurized air, each of said pipes extending through said casing near its upper end, a valve separating said pipes within said casing, said plunger rod having an upper end operating said valve, said valve being adapted to vary the amount of air pressure in said outlet pipe with respect to the air pressure in said inlet pipe as said plunger rod rises and falls in conjunction with the rotation of said cam, shaft, lever and float, so that the height of rise of said float can be measured in terms of air pressure.

3. Apparatus for measuring the liquid level in a mud pit, comprising a translative device in accordance with claim 1, a source of air pressure connected to said inlet pipe of said translative device, and a pressure gauge connected to said outlet pipe of said translative device and calibrated to read pounds of air pressure in terms of height of liquid level in said body of liquid.

4. Apparatus for measuring the liquid level in a mud pit, comprising a translative device in accordance with claim 2, a source of air pressure connected to said inlet pipe of said translative device, a high pressure switch connected to said outlet pipe of said translative device and actuated by an increase in air pressure above a predetermined amount, a low pressure switch connected to said outlet pipe and actuated by a decrease in air pressure below a predetermined amount, and signal means actuated by said switches to give an alarm when said critical air pressures are reached.

5. A self-contained translative device used in connection with other component parts for indicating the liquid level in a mud pit in oil well drilling operations, comprising a casing having upper and lower ends and two sides, a shaft extending through both sides of said casing and rotatably mounted thereto, a lever fixably attached at its upper end to said shaft outside of said casing, a cam fixably attached to said shaft inside of said casing, said lever having a lower end adapted so that a float resting on a body of liquid may be fixably attached thereto, a pivot mechanism, said pivot mechanism comprising a bar having two ends, said bar comprising a pair of legs pivotally attached to the inside of said casing at one end and supporting a roller rotatably mounted between said legs at the second end, said roller adapted to rest on the upper surface of said cam, a cap member located above said roller and connecting said pair of legs together, a plunger rod located above and resting on said cap member and adapted to rise and fall as said shaft and cam are rotated with the rise and fall of said float and the liquid level of the body of liquid, an inlet air pipe adapted to receive pressurized air and an outlet air pipe adapted to discharge pressurized air, each of said pipes extending through said casing near its upper end, a valve separating said pipes within said casing, said plunger rod having an upper end operating said valve, said valve being adapted to vary the amount of air pressure in said outlet pipe with respect to the air pressure in said inlet pipe as said plunger rod rises and falls in conjunction with the rotation of said cam, shaft, lever and float, so that the height of rise of said float can be measured in terms of air pressure.

6. A self-contained translative device for indicating liquid level which comprises a casing, a cam rotatably attached to said casing, a lever having one end connected to float means adapted to rest on the surface level of a liquid body and the other end connected to rotate said cam to a position according to the height of said liquid surface, a cam follower comprising a bar having two ends one of which is pivotally attached to said casing and the other of which supports a roller rotatably mounted thereon which rides on the contour of said cam, an air inlet pipe adapted to receive pressurized air and an air outlet pipe adapted to discharge pressurized air, valve means connected between said inlet and said outlet pipes which, when operated, varies the air pressure in said outlet pipe, and a plunger rod having one end resting on said cam follower and its other end operating said valve so that as said plunger rod rises and falls in conjunction with the rotation of said cam, the height of said liquid surface is indicated by air pressure in said outlet pipe.

7. A self-contained translative device for indicating liquid level which comprises a casing, a cam rotatably attached to said casing, a lever having one end connected to float means adapted to rest on the surface level of a liquid body and the other end connected to rotate said cam to a position according to the height of said liquid surface, a cam follower comprising a pair of parallel legs the first ends of which are pivotally attached to said casing and the second ends of which support a roller rotatably mounted therebetween which rides on the contour of said cam, said cam follower further comprising a cap member connecting said second ends together above said roller, an air inlet pipe adapted to receive pressurized air and an air outlet pipe adapted to discharge pressurized air, valve means connected between said inlet and said outlet pipes which, when operated, varies the air pressure in said outlet pipe, and a plunger rod having one end resting on said cam follower cap member and its other end operating said valve so that as said plunger rod rises and falls in conjunction with the rotation of said cam, the height of said liquid surface is indicated by air pressure in said outlet pipe.

8. A self-contained translative device for indicating liquid level which comprises a casing, a cam rotatably attached to said casing, a lever having one end connected to float means adapted to rest on the surface level of a liquid body and the other end connected to rotate said cam to a position according to the height of said liquid surface, a cam follower pivotally attached to said casing and resting on said cam, and air inlet pipe, a source of air pressure connected to said inlet pipe, an air outlet pipe, a pressure gauge connected to said outlet pipe which is calibrated to read pounds of air pressure in terms of height of liquid level in said body of liquid, valve means connected between said inlet and said outlet pipes which, when operated varies the air pressure in said outlet pipe, and a plunger rod having one end resting on said cam follower and its other end operating said valve so that as said plunger rod rises and falls in conjunction with the rotation of said cam, the height of said liquid surface is indicated by air pressure in said outlet pipe.

9. A self-contained translative device for indicating liquid level which comprises a casing, a cam rotatably attached to said casing, a lever having one end connected to float means adapted to rest on the surface level of a liquid body and the other end connected to rotate said cam to a position according to the height of said liquid surface, a cam follower pivotally attached to said casing and resting on said cam, an air inlet pipe, a source of air pressure connected to said inlet pipe, an air outlet pipe, a high pressure switch connected to said outlet pipe which is actuated by an increase in air pressure above a predetermined value, a low pressure switch connected to said outlet pipe which is actuated by a decrease in air pressure below a predetermined value, signal means actuated by either one of said switches to give an alarm if said predetermined values are reached, valve means connected between said inlet and said outlet pipes which, when operated, varies the air pressure in said outlet pipe, and a plunger rod having one end resting on said cam follower and its other end operating said valve so that as said plunger rod rises and falls in conjunction with the rotation of said cam, the height of said liquid surface is indicated by air pressure in said outlet pipe.

References Cited in the file of this patent

UNITED STATES PATENTS

| | | |
|---|---|---|
| 891,627 | MacKenzie | June 23, 1908 |
| 1,898,546 | Kelley | Feb. 21, 1933 |
| 2,416,570 | Coleman | Feb. 25, 1947 |
| 2,618,155 | Conner et al. | Nov. 18, 1952 |
| 2,627,178 | Hayward et al. | Feb. 3, 1953 |
| 2,747,607 | Matasovic | May 29, 1956 |
| 2,820,472 | Spence | Jan. 21, 1958 |

FOREIGN PATENTS

| | | |
|---|---|---|
| 17,263 | Great Britain | 1896 |
| 150,984 | Germany | May 3, 1904 |

UNITED STATES PATENT OFFICE
CERTIFICATE OF CORRECTION

Patent No. 3,138,956                                   June 30, 1964

William Falgout et al.

It is hereby certified that error appears in the above numbered patent requiring correction and that the said Letters Patent should read as corrected below.

Column 2, line 49, after "Consequently" insert a comma; column 3, line 18, for "diphragm" read -- diaphragm --; column 4, line 8, for "higher" read -- high --; column 5, line 30, for the claim reference numeral "2" read -- 1 --; column 6, line 44, for "and", second occurrence, read -- an --.

Signed and sealed this 10th day of November 1964.

(SEAL)
Attest:

ERNEST W. SWIDER
Attesting Officer

EDWARD J. BRENNER
Commissioner of Patents